(12) United States Patent
Wyle et al.

(10) Patent No.: US 11,105,535 B2
(45) Date of Patent: *Aug. 31, 2021

(54) SYSTEM AND METHOD FOR COLLECTING SOLAR ENERGY WITH A STATIONARY THERMAL STORAGE DEVICE

(71) Applicant: Thermal Storage Systems, Los Angeles, CA (US)

(72) Inventors: Frank Stephen Wyle, Los Angeles, CA (US); Alan J. Spero, Ramona, CA (US)

(73) Assignee: Thermal Storage Systems, Los Angeles, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/550,546

(22) Filed: Aug. 26, 2019

(65) Prior Publication Data

US 2020/0049379 A1 Feb. 13, 2020

Related U.S. Application Data

(63) Continuation of application No. 15/632,979, filed on Jun. 26, 2017, now Pat. No. 10,415,854, which is a continuation of application No. 14/197,993, filed on Mar. 5, 2014, now Pat. No. 9,689,586.

(60) Provisional application No. 61/772,816, filed on Mar. 5, 2013.

(51) Int. Cl.
| | | |
|---|---|---|
| *F24S 50/20* | (2018.01) | |
| *F24S 20/20* | (2018.01) | |
| *F24S 30/452* | (2018.01) | |
| *F24S 23/71* | (2018.01) | |
| *F24S 60/10* | (2018.01) | |
| *F24S 30/00* | (2018.01) | |

(52) U.S. Cl.
CPC ............... *F24S 50/20* (2018.05); *F24S 20/20* (2018.05); *F24S 23/71* (2018.05); *F24S 30/452* (2018.05); *F24S 60/10* (2018.05); *F24S 2020/23* (2018.05); *F24S 2030/134* (2018.05); *F24S 2030/145* (2018.05); *Y02E 10/40* (2013.01); *Y02E 10/47* (2013.01)

(58) Field of Classification Search
CPC .. F24S 50/20; F24S 60/10; F24S 23/71; F24S 20/20; F24S 30/452; F24S 2020/23; Y02E 10/40; Y20E 10/47
See application file for complete search history.

(56) References Cited

U.S. PATENT DOCUMENTS 3,905,352 A * 9/1975 Jahn ........................ F24S 20/20
126/578
3,998,206 A * 12/1976 Jahn ........................ F24S 20/20
126/578

(Continued)

*Primary Examiner* — Edelmira Bosques
*Assistant Examiner* — Nikhil P Mashruwala
(74) *Attorney, Agent, or Firm* — Larry E. Henneman, Jr.; Henneman & Associates. PLC

(57) ABSTRACT

A novel portable solar energy system includes a solar concentrator, a thermal storage device, an azimuth adjustment system, an elevation system, and a heat exchanger, all mounted on a rotatable support frame. In a particular embodiment, the thermal storage device remains at a fixed vertical height and fixed tilt orientation when adjustments are made to the azimuth adjustment system and/or the elevation adjustment system.

37 Claims, 9 Drawing Sheets

(56) References Cited

U.S. PATENT DOCUMENTS

| | | | | |
|---|---|---|---|---|
| 4,111,184 A * | 9/1978 | Fletcher | ............... | F24S 23/71 |
| | | | | 126/577 |
| 4,210,463 A * | 7/1980 | Escher | ................ | F24S 20/20 |
| | | | | 136/246 |
| 4,300,538 A * | 11/1981 | Uroshevich | ........... | F24S 20/20 |
| | | | | 126/649 |
| 8,378,280 B2 * | 2/2013 | Mills | .................... | F24S 60/00 |
| | | | | 250/203.4 |
| 9,022,020 B2 * | 5/2015 | Mills | .................... | F24S 23/79 |
| | | | | 126/572 |
| 10,203,164 B2 * | 2/2019 | Olsen | ............... | F28D 20/028 |

\* cited by examiner

SYSTEM AND METHOD FOR COLLECTING SOLAR ENERGY WITH A STATIONARY THERMAL STORAGE DEVICE

RELATED APPLICATIONS

This application is a continuation of co-pending U.S. patent application Ser. No. 15/632,979, filed on Jun. 26, 2017 by the same inventors, which is a continuation of U.S. patent application Ser. No. 14/197,993 (now U.S. Pat. No. 9,689,586) filed on Mar. 5, 2014 by the same inventors, which claims the benefit of priority of U.S. Provisional Patent Application Ser. No. 61/772,816, filed Mar. 5, 2013 by at least one common inventor and entitled "System And Method For Collecting Solar Energy With A Stationary Thermal Storage Device." All prior related applications are incorporated herein by reference in their entireties.

BACKGROUND OF THE INVENTION

Field of the Invention

This invention relates generally to thermal energy collection and storage systems, and more particularly to portable thermal energy collection and storage systems.

Description of the Background Art

Thermal energy storage systems are a fast growing and evolving technology. Some systems convert solar energy into thermal energy and store it in some type of thermal storage medium (e.g., NaNO2, NaNO3, CaCl2, LiF, KNO3, etc.). Typically, this is done in large facilities that provide energy to multiple consumers. Such facilities often employ several light focusing devices, both light permissive (e.g. Fresnel lens) and reflective (e.g. parabolic mirror), to heat some type of large thermal storage device such as, for example, a fluid reservoir, a pipe network, etc.

Although such facilities provide useful clean energy, they are stationary and, therefore, can only provide energy to consumers that are located relatively close to the facility. In an effort to provide energy to more remote locations, portable thermal energy storage systems have been developed. Such systems typically include a small light focusing device that heats a discrete thermal storage device via sunlight. Additionally, such systems employ some suitable sun tracking system that adjusts the position of the light focusing device and thermal storage device to accommodate for the continuous change in position of the sun. That is, the sun tracking system assures that the optical axis is pointed at the sun throughout the day. In doing so, the thermal storage device is typically tilted, turned, lifted, and/or lowered throughout the day.

There are several challenges with current portable thermal energy storage systems. For example, thermal storage devices are inherently massive because the amount of heat storage is proportional to the amount of material in which the heat is stored. Consequently, mounting a massive storage unit at the focal point of a light focusing device would impose undesirable strength and rigidity requirements on the tracking system and also increase the tracking power required to vary the vertical height of the thermal storage device. As another example, there are undesirable consequences of tilting thermal storage devices. Because the orientation of a storage container changes throughout the day, any such mounting requires that the storage container be sealed to prevent loss of the storage medium. Some storage media (such as salts or aluminum) can be corrosive. As the container's orientation with respect to the vertical is changed, that medium will come into contact with the sealed lid and the joint between the lid and container, which can cause failure of the seal/joint. Furthermore, should the heat storage mechanism (such as a phase change) involve changes in volume of the heat storage medium, any lid sealing technique must be sufficiently strong to withstand the forces resulting from this volume change. Ultimately, the demands on the container and lid become difficult to meet.

What is needed, therefore, is a portable thermal storage system that does not require changing the vertical height of the thermal storage device to maintain optical alignment between the solar energy concentrator and the thermal storage device as the position of the sun changes. What is also needed is a portable thermal storage system that does not require tilting the thermal storage device to maintain optical alignment between the solar energy concentrator and the thermal storage device as the position of the sun changes.

SUMMARY

The present invention overcomes the problems associated with the prior art by providing a portable solar energy collection system with a relatively stationary thermal storage device. The invention facilitates the conversion of solar energy to thermal energy and the storage and use of the thermal energy, all at remote locations.

In an example embodiment, a portable solar energy system includes a support frame, a thermal energy storage device, a solar concentrator, and an elevational adjustment system. The thermal energy storage device is supported by the support frame. The solar energy concentrator is adjustably coupled to the support frame to direct solar energy to the thermal energy storage device. The elevation adjustment system is coupled to adjust the elevational angle of the solar energy concentrator, and the tilt and vertical position of the thermal energy storage device remain fixed as elevation adjustments are made to the solar energy concentrator.

The example portable solar energy system additionally includes an azimuthal adjustment system adapted to adjust the azimuthal angle of the solar energy concentrator. The tilt and vertical position of the thermal energy storage device remain fixed as azimuthal adjustments are made to the solar energy concentrator. The tile and vertical position of the thermal energy storage device can remain fixed, at least in part because the thermal energy storage device and the solar energy concentrator are rotatable about a common axis, which passes through a focal point of the solar energy concentrator. In the example embodiment, the solar energy concentrator is a concave reflector.

In the example embodiment, the thermal energy storage device includes a solar light receiver operative to convert solar energy into thermal energy. The thermal energy storage device is a canister having a thermal energy storage medium (optionally a metallic phase change material) disposed therein, the solar light receiver being a concave, exterior surface of the canister. The example embodiment additionally includes a shutter disposed adjacent the concave surface. The shutter defines an aperture through which portions of the concave surface are selectively exposed to solar energy from the solar concentrator. The shutter is disposed over the solar light receiver to minimize convective and radiative heat loss. The optical aperture of the shutter remains coaxially aligned with the optical axis of the solar energy concentrator while the solar energy concentrator is moved with respect to the solar energy receiver. An example means of achieving this result is that the solar energy concentrator is directly coupled to the shutter to maintain a fixed positional relationship between the solar energy concentrator and the shutter.

The elevation adjustment system rotates the solar energy concentrator about another axis passing through the focal point of the solar energy concentrator. The common axis, around which the thermal energy storage device and the solar energy concentrator are rotated by the azimuthal control system, is substantially parallel to the another axis, around which the elevational adjustment system rotates the solar energy concentrator. In the example embodiment, the elevation adjustment system includes a rack and pinion system to facilitate the elevation adjustments of the elevation adjustment system. The rack is formed on a supporting structure curved around a focal point of the solar concentrator.

In the example embodiment, the frame includes a circular track and a supporting structure rotatable on the track. A drive mechanism rotates the supporting structure on the track.

Another example portable solar energy system includes a support frame, a thermal energy storage device supported by the support frame, a solar energy concentrator, and elevational adjustment system, and means for maintaining the tilt and vertical position of the thermal energy storage device as elevational adjustments are made to the solar energy concentrator. The solar energy concentrator is adjustably coupled to the support frame to direct solar energy to the thermal energy storage device. The elevation adjustment system is coupled to adjust the elevational angle of the solar energy concentrator. Example means for maintaining the tilt and vertical position of the thermal energy storage device as elevation adjustments are made to the solar energy concentrator are shown in the specification and drawings and include, but are not limited to a direct rigid connection between a shutter and the solar energy concentrator.

Yet another example portable solar energy system includes a support frame, a thermal energy storage device, a solar concentrator, and an azimuthal adjustment system. The thermal energy storage device is supported by the support frame. The solar energy concentrator is adjustably coupled to the support frame to direct solar energy to the thermal energy storage device. An azimuthal adjustment system is coupled to adjust an azimuthal angle of the solar energy concentrator, and the tilt and vertical position of the thermal energy storage device remain fixed as azimuthal adjustments are made to the solar energy concentrator.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a portable solar energy system that does not require changing the vertical height or tilt of the thermal storage device to maintain optical alignment between a solar energy concentrator and the thermal storage device as the position of the sun changes. In the following description, numerous specific details are set forth (e.g., solar concentrator types/shape, thermal storage media, etc.) in order to provide a thorough understanding of the invention. Those skilled in the art will recognize, however, that the invention may be practiced apart from these specific details. In other instances, details of well-known metallurgy practices (e.g., alloying of thermal storage medium, surface treatment of thermal storage medium container, etc.) and components have been omitted, so as not to unnecessarily obscure the present invention.

Figure 1:
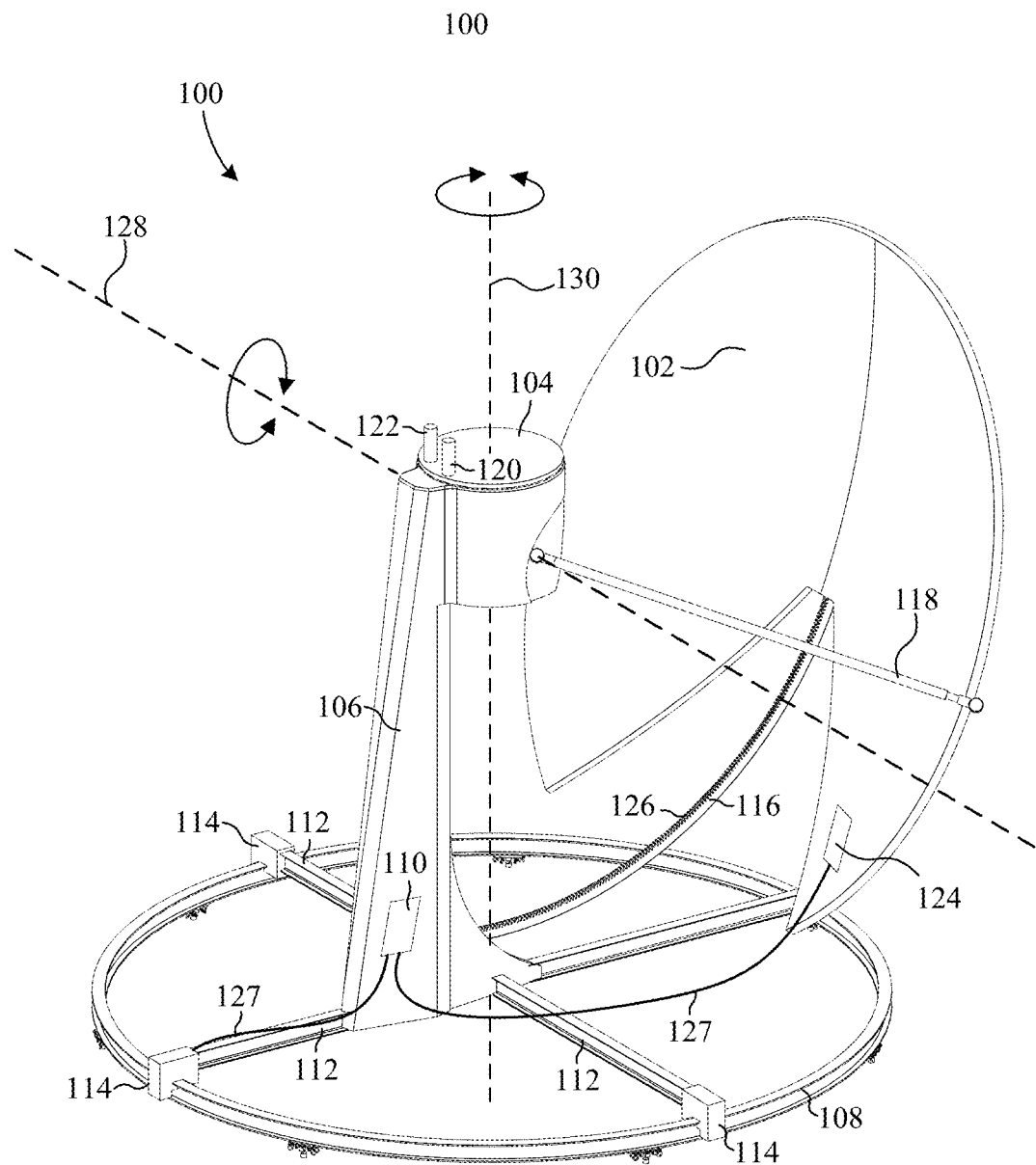
FIG. 1 is perspective view of a portable solar energy system.

FIG. 1 shows a perspective view of a portable solar energy storage system 100 according to one embodiment of the present invention. Thermal storage system 100 includes a solar concentrator 102, a thermal energy storage device 104, a central support structure 106, a circular track 108, and a sun tracking controller 110. Central support structure 106 is supported by a plurality of horizontal struts 112 that engage circular track 108 via a plurality of track engaging devices/drivers 114. Solar concentrator 102 is coupled to central support structure 106 by an arcuate support arm 116, and to thermal storage device 104 by a pair of linkages 118. Thermal energy storage device 104 is supported in a fixed vertical position and at a fixed tilt by central support structure 106. Thus, the entire portable thermal energy storage system 100 rest upon and is rotatable upon circular track 108.

In this particular embodiment, solar concentrator 102 is a parabolic reflector that concentrates and reflects impinging sunlight onto thermal energy storage device 104. Those skilled in the art will recognize that other types of solar concentrators can also be used. Thermal storage device 104 is operative to receive solar energy from solar concentrator 102, to convert the solar energy into thermal energy, and to store the thermal energy for later use and/or real-time use. Thermal energy is extracted from thermal energy storage device 104 by flowing an exchange fluid (e.g., water) into and out of thermal energy storage device 104 via an inlet conduit 120 and an outlet conduit 122, respectively. Although not shown, flexible hoses connect to fluid inlet conduit 120 and outlet conduit 122 to carry fluid to and from a heat exchanger (FIG. 8), respectively. The rotation of thermal energy storage device 104 is limited to 180 degrees in either direction (360 degrees total), so no special couplings are required for the exchange fluid, as long as the couplings are suitable for the operating temperature range.

Sun tracking controller 110 keeps solar concentrator 102 directed at the sun. Based on feedback from a sensor 124, sun tracking controller 110 determines the position of the sun and adjusts the position of solar concentrator 102 and thermal storage device 104 to reflect the optimal amount of sunlight onto thermal storage device 104. Sun tracking controller 110 provides control signals to an elevational drive system (not shown) housed within central support structure 106 to adjust the elevation of solar concentrator 102 and provides control signals to an azimuthal control system (track engaging drivers 114) to adjust the azimuth of solar concentrator 102. There are many other known suitable systems for determining the position of the sun that can be implemented in thermal storage system 100. For example, systems based on time-of-day and global position can also be used. Any such systems can be used in conjunction with the elevational adjustment means and/or the azimuthal adjustment means described herein. Sun tracking controller 110 communicates with sensor 124 and the azimuthal and elevational controls via a plurality of signal wires 127.

Elevational adjustment is accomplished by rotating solar concentrator 102 about a horizontal axis 128 that passes through the focal point of solar concentrator 102. Arcuate support arm 116 includes a plurality of teeth 126 which are engaged by an electric motor driven pinion gear (not shown) that drives arcuate support arm 116 to rotate about horizontal axis 128. Solar concentrator 102 is rigidly fixed to arcuate support arm 116 and, therefore, also rotates about horizontal axis 128. Alternatively, a linear actuator could be used to rotate solar concentrator 102 about horizontal axis 128.

Azimuthal adjustment is accomplished by rotating solar concentrator 102 and thermal storage device 104 about a vertical axis 130. Azimuthal adjustment system 126 includes horizontal struts 112 that drivably engage a circular track 108 via track engaging devices/drivers 114. In the example embodiment, struts 112 are rigidly attached to devices/drivers 114, which in turn engage circular track 108. Although not shown, at least one of track engaging devices/drivers can optionally include some type of electric motor driven gear that engages complementary gear teeth on circular track 108 to drive the rotation of solar concentrator 102 and thermal energy storage device 104 about vertical axis 130.

Figure 2:
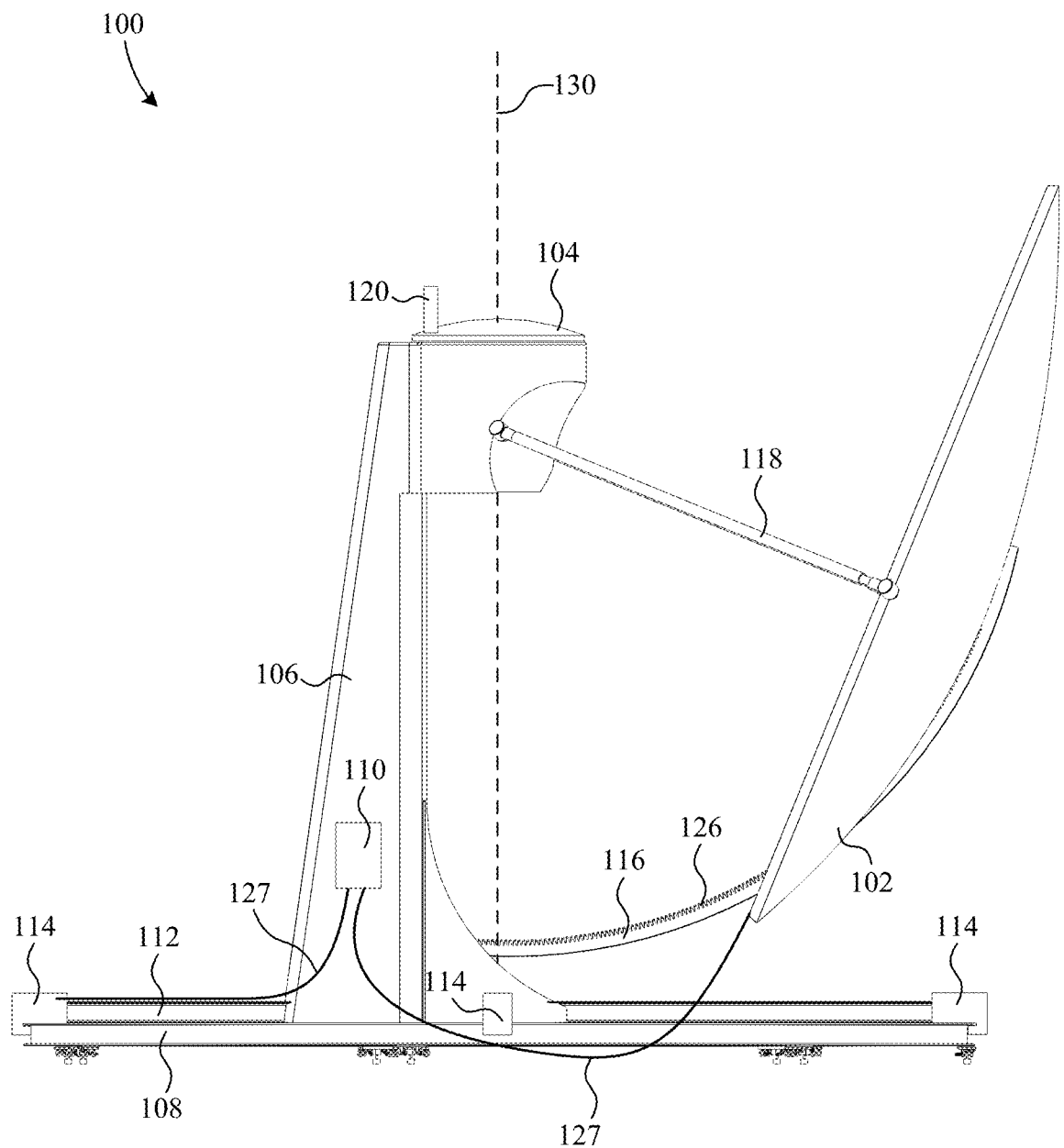
FIG. 2 is a side view of the portable solar energy system of FIG. 1 when the sun is at low elevation.

FIG. 2 shows a side view of portable solar energy system 100 as it would appear when the sun is at a relatively low elevation (less than 45 degrees). As shown, this is achieved by driving arcuate support arm 116 such that solar concentrator 102 is elevated to the optimal height at which the maximum amount of sunlight is focused onto thermal storage device 104.

Figure 3:
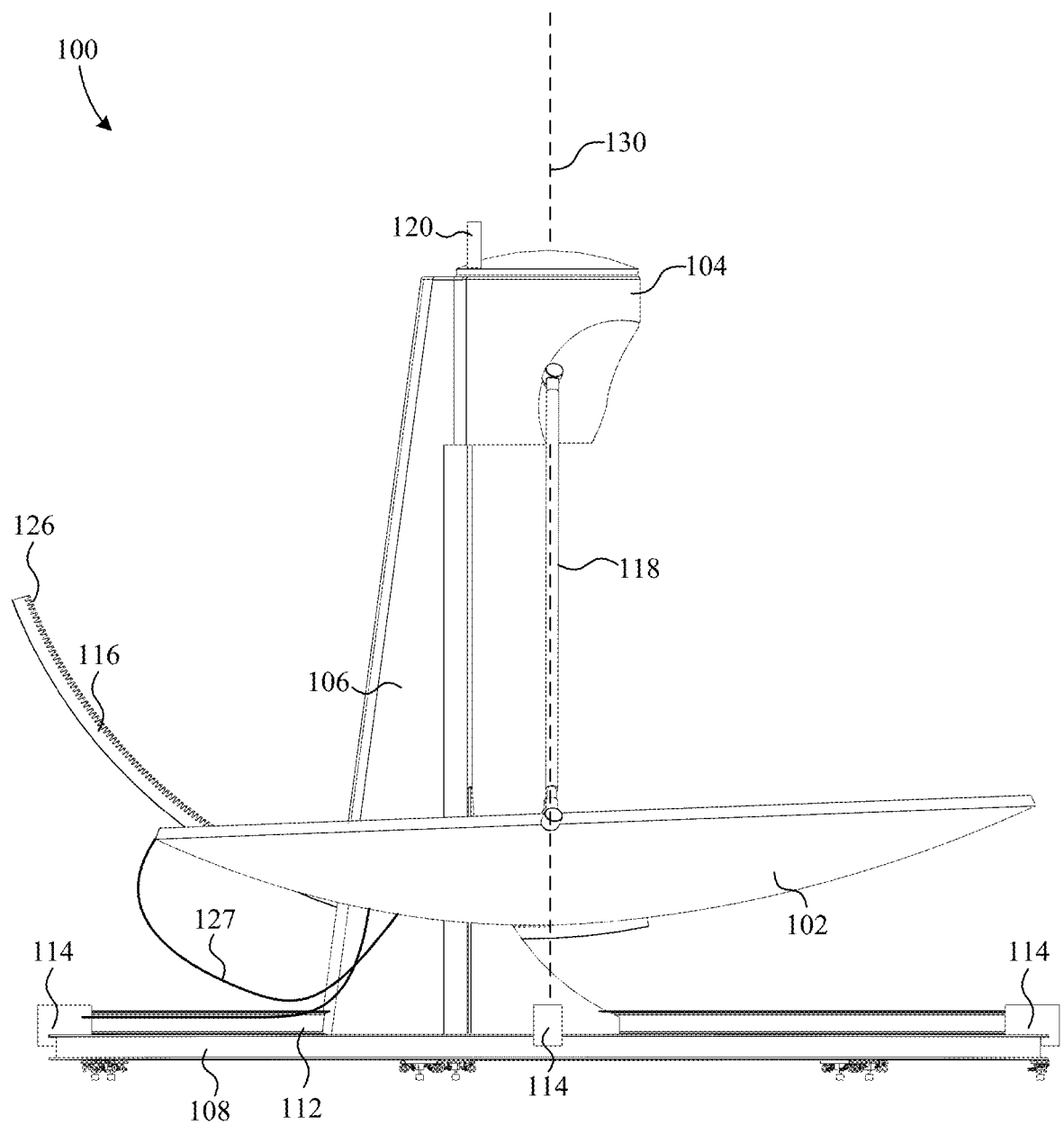
FIG. 3 is a side view of the portable solar energy system of FIG. 1 when the sun is at high elevation.

FIG. 3 shows a side view of portable thermal energy storage system 100 as would appear when the sun is at a high elevation. It is important to recognize that the overall design of portable thermal energy storage system 100 is such that the vertical position of thermal energy storage device 104 remains fixed at all times. That is, the vertical position of thermal storage device 104 remains fixed before, during, and after adjustments are made to the elevation of solar concentrator 102 and/or adjustments to the azimuthal position of solar concentrator 102. This provides an important advantage in that it eliminates the need to lift and lower thermal energy storage device 104. Of course, thermal storage device 104 would likely be heavy. Therefore, the need to lift and lower thermal energy storage device 104 imparts undesirable design constraints on a solar energy system, especially with respect to the mass of thermal storage medium that can be efficiently used in the system. Of course, the mass of thermal storage medium is directly related to the thermal energy storage capacity of the system. It is also important to recognize that the overall tilt orientation of thermal energy storage device 104 remains fixed during azimuthal and elevational adjustments. That is, the tilt orientation of thermal energy storage device 104 remains fixed before, during, and after adjustments are made to the elevation of solar concentrator 102 and/or adjustments to the azimuthal position of solar concentrator 102. This provides and important advantage because it eliminates the problems associated with tilting canister thermal storage canister 112. For example, tilting canister 112 causes the internal thermal energy storage medium (e.g. molten aluminum) to contact the joint between canister 112 and a canister lid. When the internal thermal energy storage medium contacts the joint between canister 112 and the canister lid, the joint can be compromised. In general, the invention provides a portable thermal energy storage system that can track the sun without causing any elevation change and/or tilt change of thermal energy storage device 104.

Figure 4:
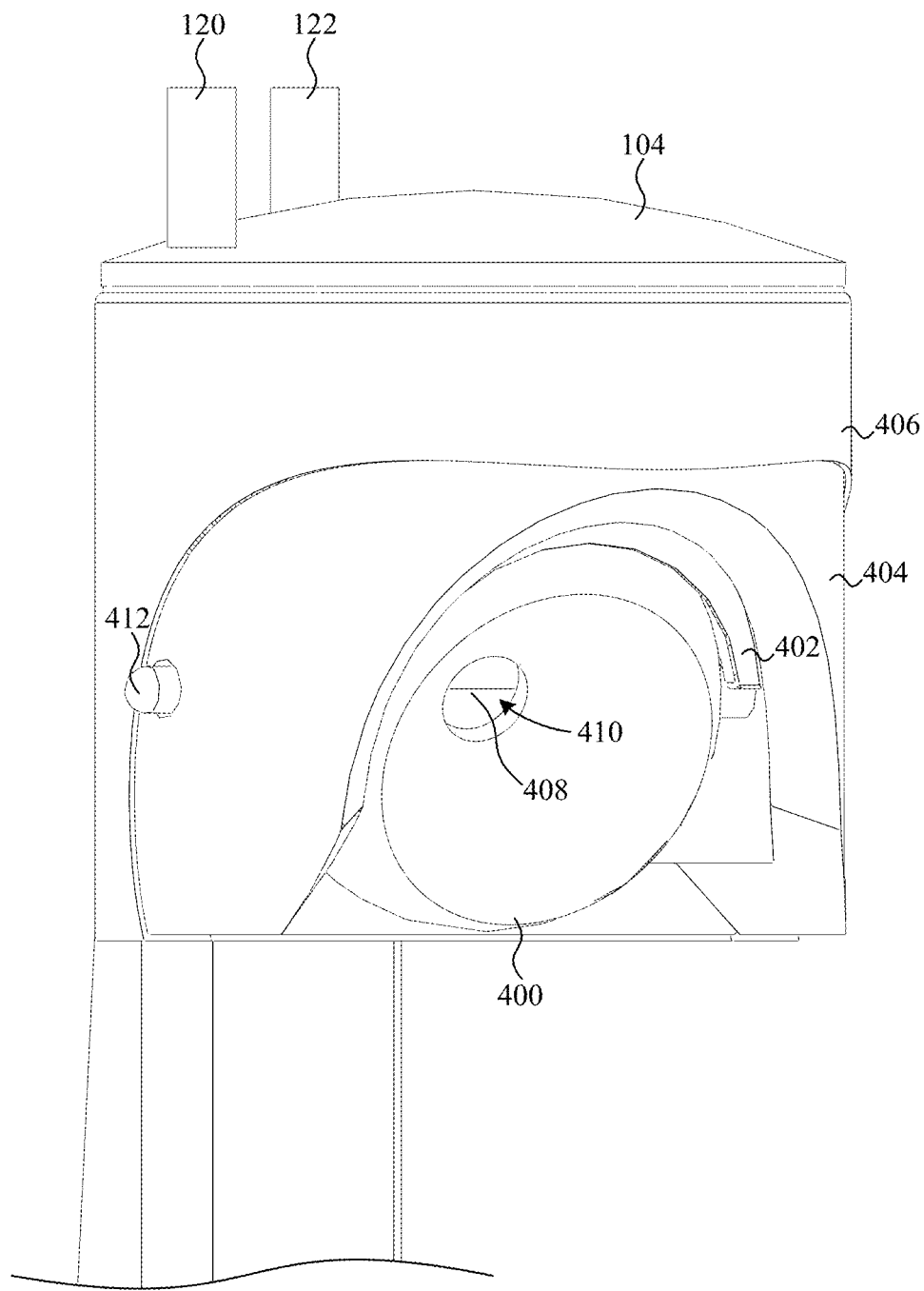
FIG. 4 is a perspective view of a thermal energy storage device of the portable solar energy system of FIG. 1.

FIG. 4 is a perspective view of thermal energy storage device 104, wherein linkages 118 are removed so as not obstruct the view of thermal energy storage device 104. Thermal energy device 104 includes a shutter 400, canister 402, heat exchanger (not visible in FIG. 4), an insulation layer 404, and an outer shell 406. A portion of canister 402 defines a receiver surface 408, which is visible through an aperture 410 in shutter 400. Solar energy from solar concentrator 102 is focused through aperture 410 and impinges on a portion of receiver surface 408, where it is converted to thermal energy, which conducts through the wall of canister 402 and into the thermal storage media contained in canister 402.

Shutter 400 is adapted to maintain a fixed optical alignment with respect to solar concentrator 102 at all times. This minimizes radiant and convective heat losses from canister 402 when canister 402 is heated. Shutter 400 is pivotally mounted with respect to canister 402. Shafts 412 extend from opposite sides of shutter 400 and are rigidly fastened to linkages 118 (not shown in FIG. 4. When the elevation of solar concentrator 102 is adjusted, solar concentrator moves linkages 118, which in turn rotate shafts 412 and shutter 400, thus keeping aperture 410 directed at the center of solar concentrator 102.

Figure 5:
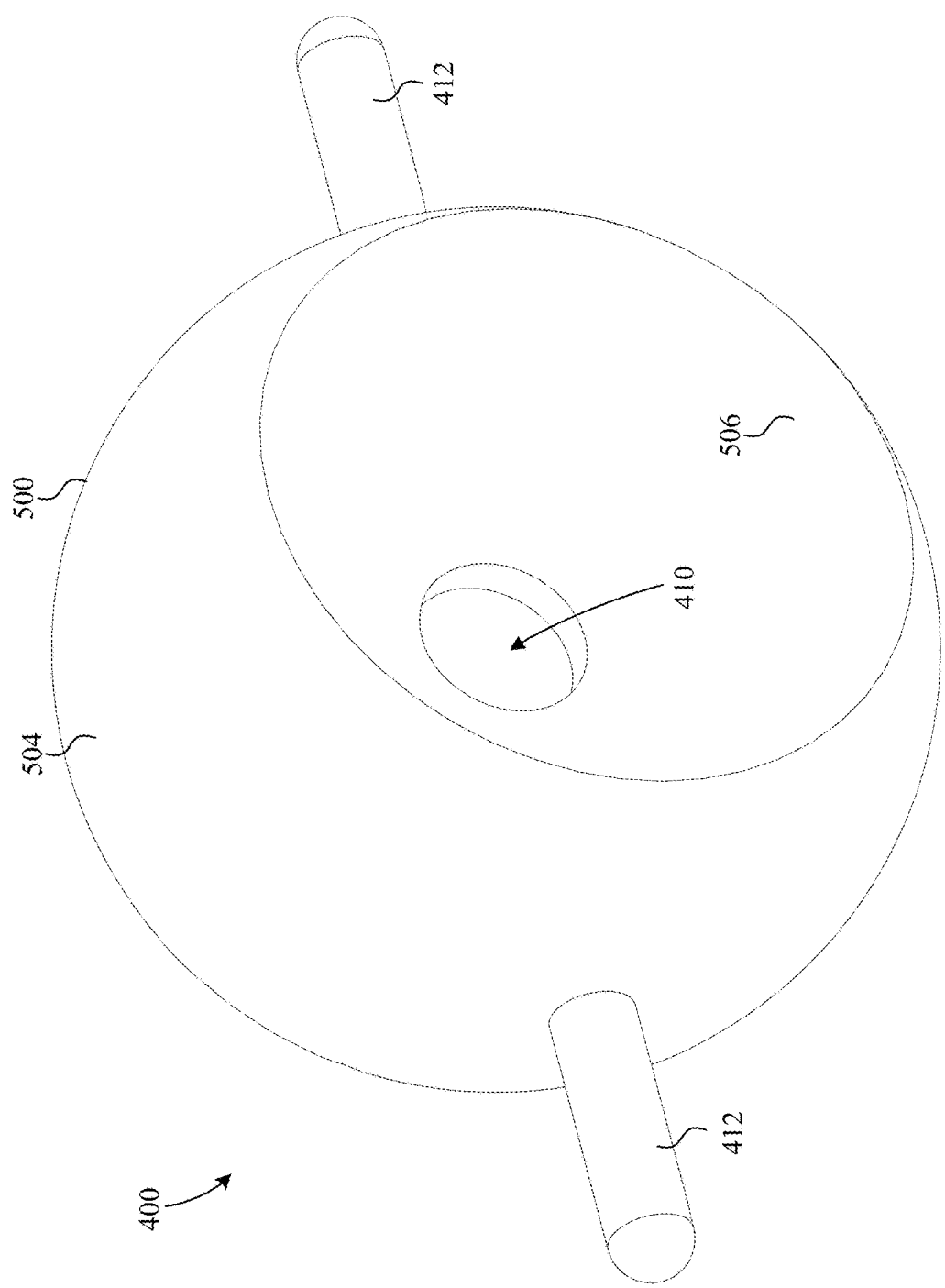
FIG. 5 is a perspective view of a shutter of the thermal energy storage device of FIG. 4.

FIG. 5. is a perspective view of shutter 400 shown removed from thermal energy storage device 104. Shutter 400 includes a body 500 having coaxially aligned shafts 412 extending from opposite sides thereof. Body 500 includes a spherical outer surface 504, a front cone-shaped recess 506, a back cone-shaped recess 508 (not visible), and aperture 410 extending therebetween. Shafts 412 are coaxially aligned with horizontal axis 128 when thermal energy storage device 104 is assembled. Shafts 412 enable shutter 400 to be pivoted about axis 128 by linkages 118, as described above, such that solar concentrator 102 focuses light through aperture 410 regardless of the elevational position of solar concentrator 102. In other words, shutter 400 is slaved to solar concentrator 102. Accordingly, the optical axis of solar concentrator 102 remains coaxially aligned with aperture 510 at all times.

Figure 6:
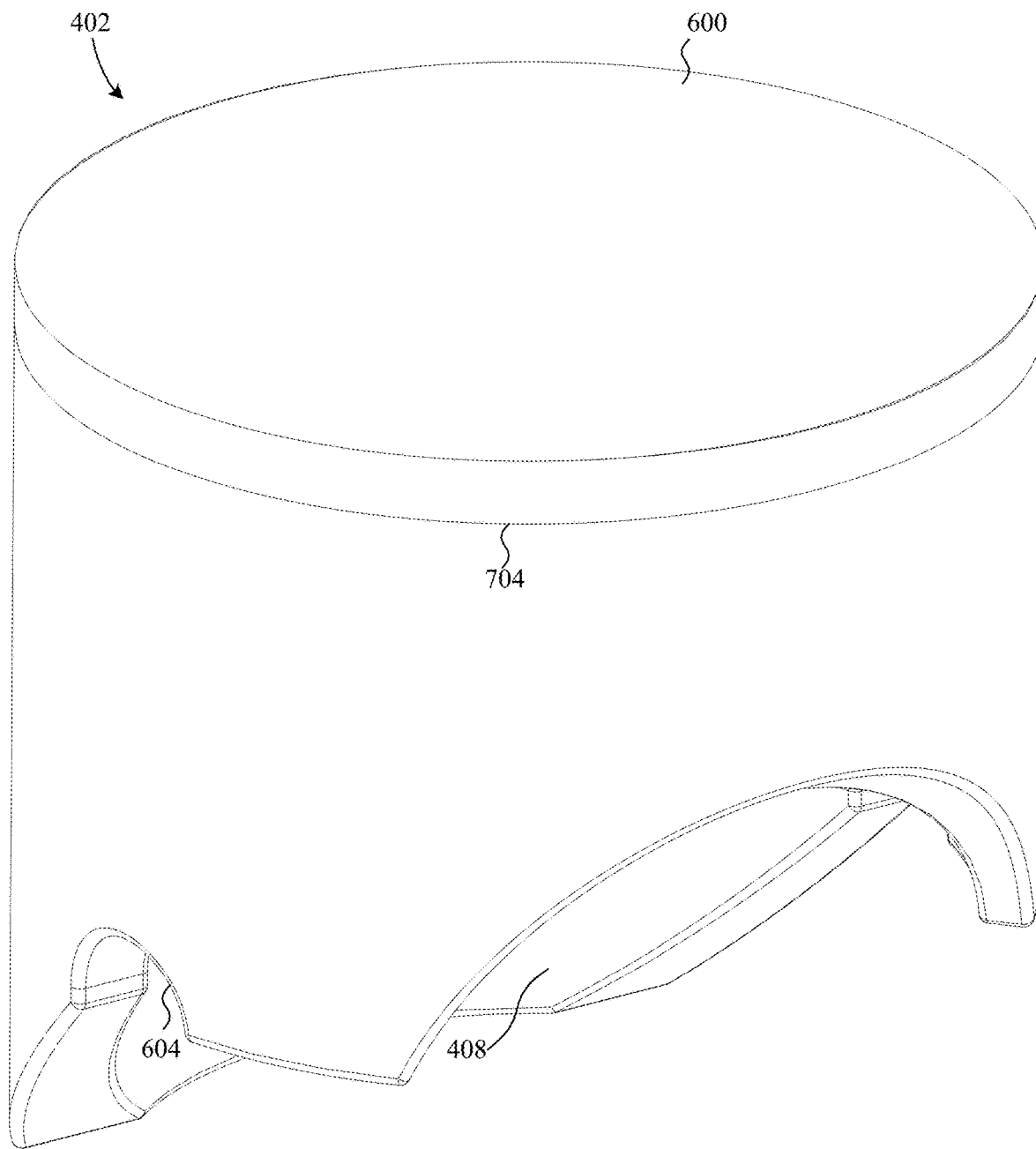
FIG. 6 is a perspective view of a thermal storage medium canister of the thermal energy storage device of FIG. 4.

FIG. 6 is a perspective view of canister 402 removed from thermal energy storage device 104. Canister 402 is a thin-walled hollow structure operative to contain a thermal energy storage medium (e.g., a metallic phase change material) therein. In this example, canister 402 includes a lid 600 that is permanently sealed to the main body of the canister by, for example, welding. As explained above, canister 402 defines receiver surface 408, which is much more visible in FIG. 6. Canister 402 additionally defines a set of semi-cylindrical regions 604, which accommodate shafts 412 of shutter 400 and are coaxial with horizontal axis 128. Receiver surface 408 defines a semi-spherical cavity contoured to receive spherical outer surface 504 of shutter 400 therein. Additionally, receiver surface 408 provides a surface wherein impinging sunlight is absorbed and converted to thermal energy that is stored in the thermal storage medium within canister 402.

Figure 7:
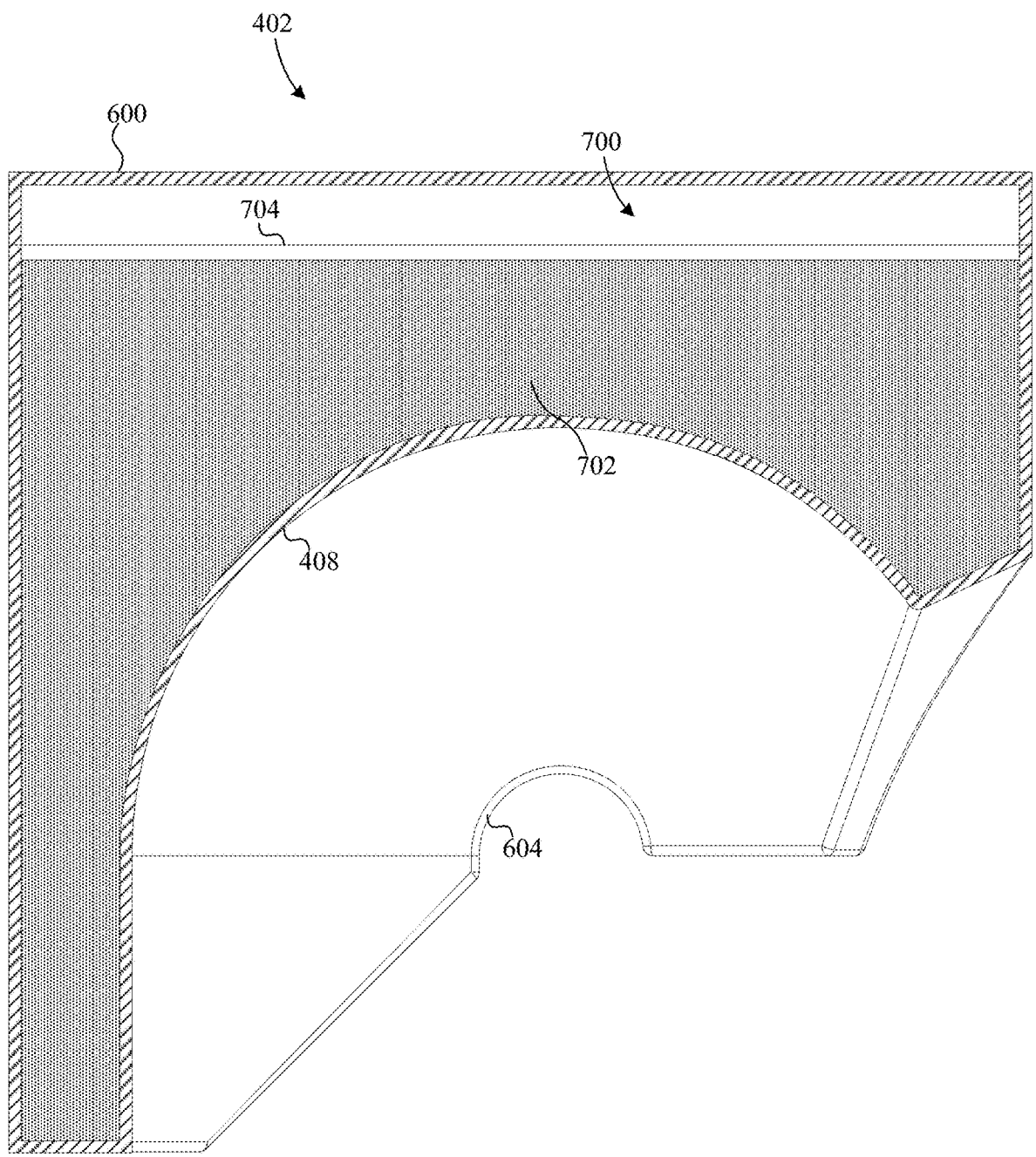
FIG. 7 is a cross-sectional side view of the canister of FIG. 6.

FIG. 7 shows a cross-sectional side view of canister 402. As shown, canister 402 additionally includes an internal cavity 700 containing a thermal storage medium 702 sealed therein. As shown, the level of thermal storage medium 702 in cavity 700 is below a seam 704 (e.g. weld line) between lid 600 and the rest of canister 402. Because canister 402 is never tilted during elevational and/or azimuthal adjustments, thermal storage medium 702 does not contact seem 704, thereby reducing the potential of breaching canister 112 when the temperature of thermal storage medium 700 reaches high levels. Indeed, the quantity of thermal storage medium 702 can be selected so that thermal storage medium 702 also does not contact seem 704 even during thermal expansion.

Figure 8:
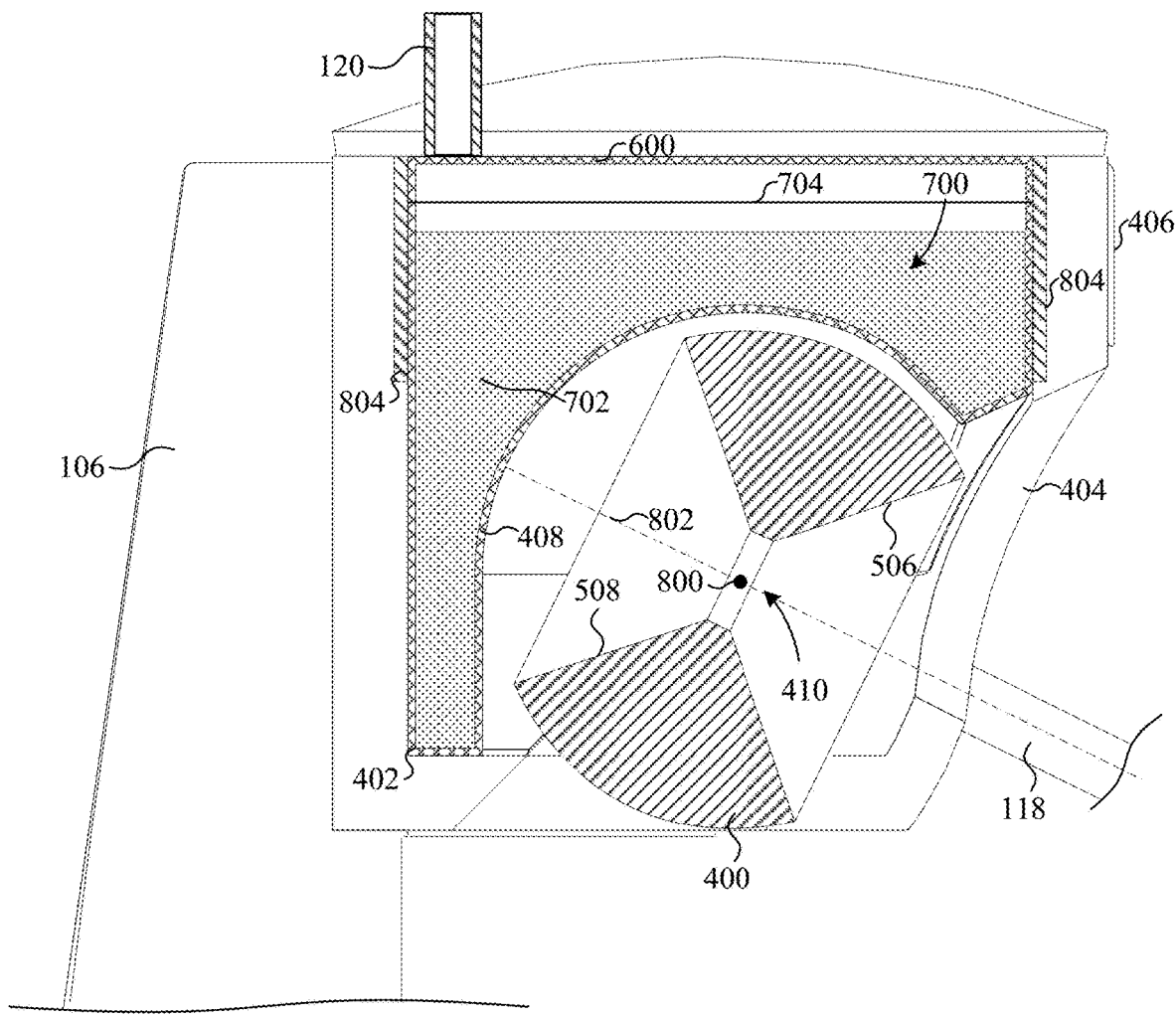
FIG. 8 is cross-sectional side view of the thermal energy storage device of FIG. 4 when the sun is at a low elevation.
Figure 9:
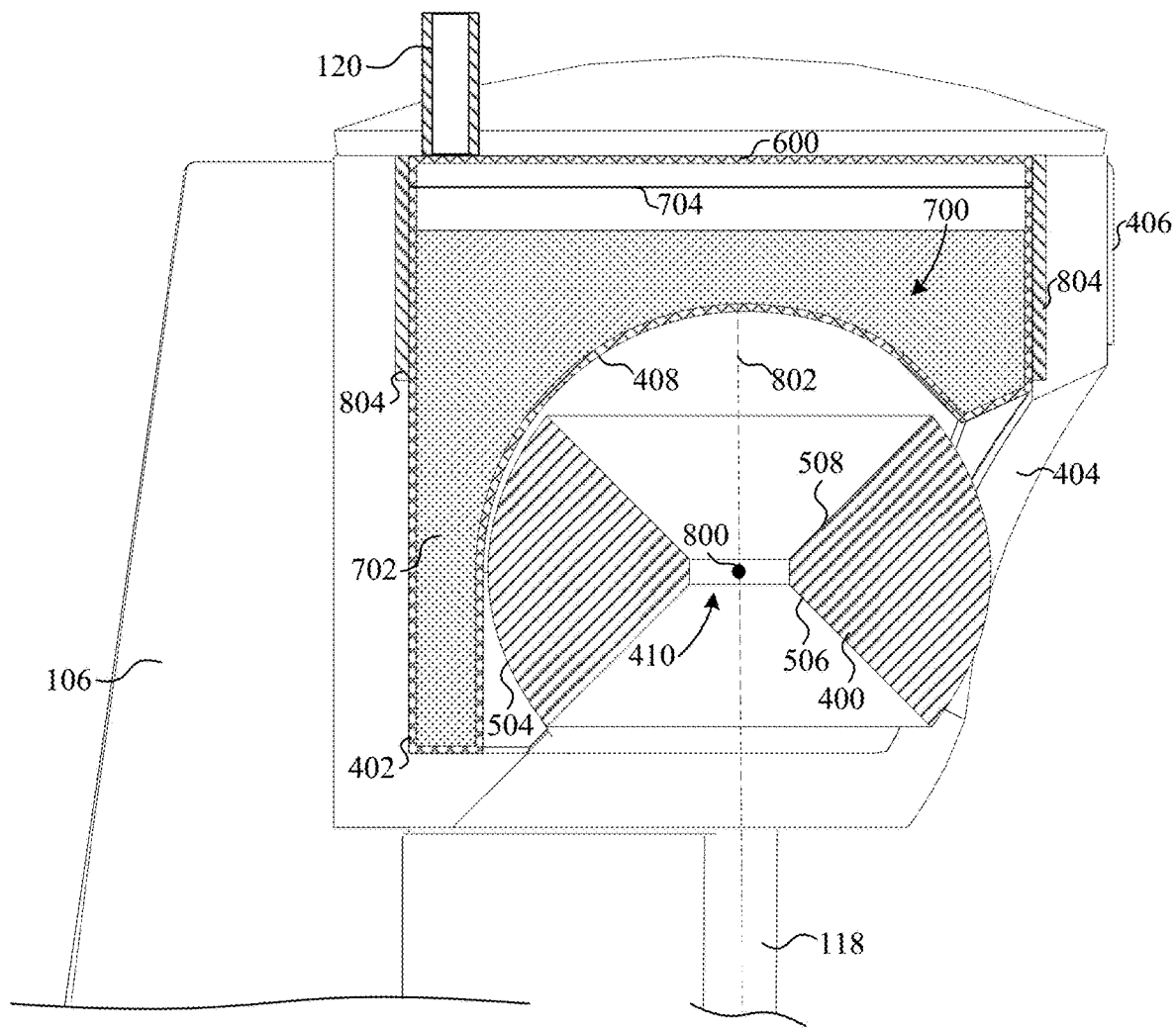
FIG. 9 is cross-sectional side view of the thermal energy storage device of FIG. 4 when the sun is at a high elevation.

FIG. 8 and FIG. 9 are cross-sectional side views of thermal energy storage device 104 illustrating the operation of thermal energy storage device 104 during elevation adjustments. FIG. 8 shows thermal energy storage device 104 when the sun is at a relatively low elevation and FIG. 9 shows thermal energy storage device 104 when the sun is at a relatively high elevation.

As shown in FIG. 8 and FIG. 9, solar concentrator 102 is configured so that the focal point 800 of solar concentrator 102 is positioned at the intersection between an optical axis 802 of solar concentrator 102 and horizontal axis 128 (FIG. 1). Horizontal axis 128 appears as a point in FIG. 8 and FIG. 9 that coincides with focal point 800. Comparing FIG. 8 and FIG. 9, it is clear that the relative orientations of shutter 400, linkages 118, and, therefore, solar concentrator 102 remain fixed regardless of the position of shutter 400 with respect to canister 112.

A heat exchanger 804 is thermally coupled to canister 112 so as to extract thermal energy therefrom. Heat transfer fluid flowing in through inlet conduit 120 absorbs heat energy from heat exchanger 804 and then flows out through outlet conduit 122 to a system (not shown) that can extract the thermal energy from the transfer fluid and put it to some beneficial use. Insulation layer 404 is formed around canister 402 and heat exchanger 804 so as to minimize thermal losses and protect any personnel in the area from thermal injury. Outer shell 406 provides a housing that at least partially covers shutter 400, canister 402, and insulation layer 404.

The operation of thermal energy storage system 100 can be summarized as follows, with reference to FIG. 1, FIG. 8, and FIG. 9. First, sensor 124 detects the position of the sun. Then, sun tracking controller provides control signals to adjust the elevational and azimuthal positions of solar concentrator 102 according to the position of the sun. More specifically, solar concentrator 102 is rotated about horizontal axis 128 by arcuate support arm 116 and rotated about vertical axis 130 by track engaging devices/drivers 114. As solar concentrator 102 is rotated about axis 128, linkages 118 are also rotated about axis 128, thereby rotating shutter 400 about horizontal axis 128. The angle of optical axis 802 with respect to vertical axis 130 determines what portion of receiver surface 408 is illuminated by sun light passing through aperture 410 and which portion is covered by spherical outer surface 504 of shutter 400. Covering the portions of receiver surface 408 when they are not being illuminated greatly reduces thermal losses from canister 402 because heat cannot radiate through surface 504 of shutter 400. Shutter 400 also minimizes convective losses from receiver surface 408. As azimuthal adjustments are made, circular track 108 remains stationary on the ground while the other components of thermal storage system 100 rotate about vertical axis 130 until solar concentrator 102 is properly positioned with respect to the sun. After thermal storage medium 702 is heated, heat can be extracted from canister 402 via heat exchanger 804. That is, with heat exchanger 804 in direct thermal contact with canister 402, cool thermal transfer fluid is pumped into inlet conduit 120, is heated as it passes through heat exchanger 804, and then discharged from outlet conduit 122. The heated thermal transfer fluid can be in the liquid (e.g. water) or gas (e.g. steam) state, depending on the particular application and operating parameters (e.g., temperature, pressure, etc.).

The description of particular embodiments of the present invention is now complete. Many of the described features may be substituted, altered or omitted without departing from the scope of the invention. For example, alternate thermal transfer fluids (e.g., ethylene glycol, propylene glycol, etc.), may be substituted for the water. As another example, alternate thermal storage media (e.g., water, metals, salts, etc.) can be used. As still another example, the embodiments described herein are well-suited for implementation in both portable and fixed thermal energy storage systems. These and other deviations from the particular embodiments shown will be apparent to those skilled in the art, particularly in view of the foregoing disclosure.

We claim:

1. A solar energy system comprising:
a support frame;
a thermal energy storage device including a solar energy receiving surface whereon impinging light is absorbed and converted into thermal energy, said thermal energy storage device being supported by said frame;
a solar energy concentrator adjustably coupled to said support frame to direct solar energy to said thermal energy storage device;
an elevation adjustment system coupled to adjust an elevational angle of said solar energy concentrator; and wherein
said elevation adjustment system rotates said solar energy concentrator about an axis passing through a focal point of said solar energy concentrator;
the tilt and vertical position of said thermal energy storage device remain fixed as elevation adjustments are made to said solar energy concentrator; and
said focal point of said solar energy concentrator is disposed between said solar energy receiving surface of said thermal energy storage device and said solar energy concentrator.

2. The solar energy system of claim 1, further comprising an azimuthal adjustment system adapted to adjust the azimuth of said solar energy concentrator, and wherein the tilt and vertical position of said thermal energy storage device remain fixed as azimuthal adjustments are made to said solar energy concentrator.

3. The solar energy system of claim 2, wherein said thermal energy storage device and said solar energy concentrator are rotatable about a common axis.

4. The solar energy system of claim 3, wherein said common axis passes through said focal point of said solar energy concentrator.

5. The solar energy system of claim 1, wherein said solar energy concentrator is a concave reflector.

6. The solar energy system of claim 1, wherein said thermal energy storage device is a canister having a thermal energy storage medium disposed therein, said solar energy receiving surface being a concave, exterior surface of said canister.

7. The solar energy system of claim 6, further comprising a shutter disposed adjacent said solar energy receiving surface, said shutter defining an aperture through which portions of said solar energy receiving surface are selectively exposed to solar energy from said solar energy concentrator.

8. The solar energy system of claim 1, wherein:
said thermal energy storage device further includes a shutter having a body defining an aperture, said aperture having an area that is less than an area of said solar energy receiving surface;
said body is disposed to prevent heat loss from a first portion of said solar energy receiving surface; and
said aperture is disposed to facilitate the passage of solar energy from said solar concentrator to a second portion of said solar energy receiving surface, said second portion of said solar energy receiving surface having an area that is greater than said area of said aperture.

9. The solar energy system of claim 8, wherein:
said aperture remains coaxially aligned with the optical axis of said solar energy concentrator while said solar energy concentrator is moved with respect to said solar energy receiving surface; and
when said solar energy concentrator is moved with respect to said solar energy receiving surface, said aperture facilitates the passage of solar energy from said solar energy concentrator to a third portion of said solar energy receiving surface different than said second portion of said solar energy receiving surface.

10. The solar energy system of claim 9, wherein said solar energy concentrator is directly coupled to said shutter to maintain a fixed positional relationship between said solar energy concentrator and said shutter.

11. The solar energy system of claim 1, wherein said solar energy concentrator is further rotatable about a second axis substantially perpendicular to said axis.

12. The solar energy system of claim 1, wherein said elevation adjustment system includes a rack and pinion system to facilitate said elevation adjustments of said elevation adjustment system.

13. The solar energy system of claim 12, wherein said rack is formed on a supporting structure curved around said focal point of said solar concentrator.

14. The solar energy system of claim 1, wherein said frame includes:
a circular track; and
a supporting structure rotatable on said track.

15. The solar energy system of claim 1, wherein said thermal energy storage device is a canister having a metallic, phase-change thermal energy storage medium disposed therein.

16. The solar energy system of claim 1, wherein said solar energy concentrator is positioned with respect to said solar energy receiving surface such that light reflected off said solar energy concentrator is diverging upon impinging onto said solar energy receiving surface of said thermal energy storage device.

17. The solar energy system of claim 16, wherein:
said thermal energy storage device further includes a shutter disposed over said solar energy receiving surface;
said shutter defines an aperture through which light from said solar energy concentrator passes to said solar energy receiving surface;
said shutter includes a tapered inlet around an external side of said aperture, through which converging light reflected off of said solar energy concentrator enters said aperture; and
said shutter includes a tapered outlet around an internal side of said aperture, through which diverging light reflected off of said solar energy concentrator exits said aperture.

18. The solar energy system of claim 1, wherein:
said thermal energy storage device further includes a shutter disposed over said solar energy receiving surface;
said shutter includes an aperture through which light passes;
said shutter includes a radial exterior surface; and
the shortest distance between said focal point and said solar energy receiving surface is greater than the shortest distance between said focal point and said radial exterior surface of said shutter.

19. The solar energy system of claim 1, further comprising:
a shutter disposed to selectively expose portions of said solar energy receiving surface; and
an insulation layer disposed at least partially around said shutter.

20. A solar energy system comprising:
a support frame;
a thermal energy storage device including a solar energy receiving surface whereon impinging light is absorbed and converted into thermal energy, said thermal energy storage device being supported by said frame;
a solar energy concentrator adjustably coupled to said support frame to direct solar energy to said thermal energy storage device;
an azimuthal adjustment system adapted to adjust the azimuth of said solar energy concentrator;
an elevation adjustment system coupled to adjust an elevational angle of said solar energy concentrator; and wherein
the tilt and vertical position of said thermal energy storage device remain fixed as azimuthal adjustments are made to said solar energy concentrator;
the tilt and vertical position of said thermal energy storage device remain fixed as elevation adjustments are made to said solar energy concentrator; and
a focal point of said solar energy concentrator is disposed between said solar energy receiving surface of said thermal energy storage device and said solar energy concentrator.

21. The solar energy system of claim 20, wherein said thermal energy storage device and said solar energy concentrator are rotatable about a common axis.

22. The solar energy system of claim 21, wherein said common axis passes through said focal point of said solar energy concentrator.

23. The solar energy system of claim 20, wherein said solar energy concentrator is a concave reflector.

24. The solar energy system of claim 20, wherein said thermal energy storage device is a canister having a thermal energy storage medium disposed therein, said solar energy receiving surface being a concave, exterior surface of said canister.

25. The solar energy system of claim 24, further comprising a shutter disposed adjacent said solar energy receiving surface, said shutter defining an aperture through which portions of said solar energy receiving surface are selectively exposed to solar energy from said solar energy concentrator.

26. The solar energy system of claim 20, wherein:
said thermal energy storage device further includes a shutter having a body defining an aperture, said aperture having an area that is less than an area of said solar energy receiving surface;
said body is disposed to prevent heat loss from a first portion of said solar energy receiving surface; and
said aperture is disposed to facilitate the passage of solar energy from said solar concentrator to a second portion of said solar energy receiving surface, said second portion of said solar energy receiving surface having an area that is greater than said area of said aperture.

27. The solar energy system of claim 26, wherein:
said aperture remains coaxially aligned with the optical axis of said solar energy concentrator while said solar energy concentrator is moved with respect to said solar energy receiving surface; and
when said solar energy concentrator is moved with respect to said solar energy receiving surface, said aperture facilitates the passage of solar energy from said solar energy concentrator to a third portion of said solar energy receiving surface different than said second portion of said solar energy receiving surface.

28. The solar energy system of claim 27, wherein said solar energy concentrator is directly coupled to said shutter to maintain a fixed positional relationship between said solar energy concentrator and said shutter.

29. The solar energy system of claim 20, wherein said solar energy concentrator is further rotatable about a second axis substantially perpendicular to said axis.

30. The solar energy system of claim 20, wherein said elevation adjustment system includes a rack and pinion system to facilitate said elevation adjustments of said elevation adjustment system.

31. The solar energy system of claim 30, wherein said rack is formed on a supporting structure curved around said focal point of said solar concentrator.

32. The solar energy system of claim 20, wherein said frame includes:
a circular track; and
a supporting structure rotatable on said track.

33. The solar energy system of claim 20, wherein said thermal energy storage device is a canister having a metallic, phase-change thermal energy storage medium disposed therein.

34. The solar energy system of claim 20, wherein said solar energy concentrator is positioned with respect to said solar energy receiving surface such that light reflected off said solar energy concentrator is diverging upon impinging onto said solar energy receiving surface of said thermal energy storage device.

35. The solar energy system of claim 34, wherein:
said thermal energy storage device further includes a shutter disposed over said solar energy receiving surface;
said shutter defines an aperture through which light from said solar energy concentrator passes to said solar energy receiving surface;
said shutter includes a tapered inlet around an external side of said aperture, through which converging light reflected off of said solar energy concentrator enters said aperture; and
said shutter includes a tapered outlet around an internal side of said aperture, through which diverging light reflected off of said solar energy concentrator exits said aperture.

36. The solar energy system of claim 20, wherein:
said thermal energy storage device further includes a shutter disposed over said solar energy receiving surface;
said shutter includes an aperture through which light passes;
said shutter includes a radial exterior surface; and
the shortest distance between said focal point and said solar energy receiving surface is greater than the shortest distance between said focal point and said radial exterior surface of said shutter.

37. The solar energy system of claim 20, further comprising:
a shutter disposed to selectively expose portions of said solar energy receiving surface; and
an insulation layer disposed at least partially around said shutter.

* * * * *